United States Patent [19]
Tonkin et al.

[11] Patent Number: 6,084,631
[45] Date of Patent: Jul. 4, 2000

[54] HIGH-SPEED DIGITAL VIDEO SERIAL LINK

[75] Inventors: Steven Wallace Tonkin, Eden Prairie; Mark Thomas Paulsen, Chanhassen, both of Minn.

[73] Assignee: PPT Vision, Inc., Eden Prairie, Minn.

[21] Appl. No.: 08/825,774

[22] Filed: Apr. 2, 1997

Related U.S. Application Data

[63] Continuation of application No. 08/410,119, Mar. 24, 1995, abandoned.

[51] Int. Cl.$^7$ .................................................. H04N 5/232
[52] U.S. Cl. ........................................ 348/212; 348/211
[58] Field of Search .................................. 348/211, 212, 348/13, 15, 705, 12, 153, 86; 370/62, 89

[56] References Cited

U.S. PATENT DOCUMENTS

| | | | |
|---|---|---|---|
| 4,326,221 | 4/1982 | Mallos et al. | 348/211 |
| 4,347,563 | 8/1982 | Paredes et al. | 364/133 |
| 4,527,270 | 7/1985 | Sweeton | 371/224 |
| 4,716,585 | 12/1987 | Tompkins et al. | 370/62 |
| 4,726,018 | 2/1988 | Bux et al. | 370/89 |
| 4,833,624 | 5/1989 | Kuwahara et al. | 395/84 |
| 5,003,532 | 3/1991 | Ashida et al. | 348/15 |
| 5,206,732 | 4/1993 | Hudson | 348/211 |
| 5,229,850 | 7/1993 | Toyoshima | 348/153 |
| 5,237,408 | 8/1993 | Blum et al. | 348/154 |
| 5,270,811 | 12/1993 | Ishibashi et al. | 348/143 |
| 5,371,535 | 12/1994 | Takizawa | 348/15 |
| 5,406,322 | 4/1995 | Port et al. | 348/15 |
| 5,486,877 | 1/1996 | Tanaka | 348/705 |
| 5,533,009 | 7/1996 | Chen | 370/61 |
| 5,550,584 | 8/1996 | Yamada | 348/153 |
| 5,581,297 | 12/1996 | Koz et al. | 348/153 |
| 5,625,407 | 4/1997 | Biggs et al. | 348/15 |
| 5,717,456 | 2/1998 | Rudt et al. | 348/86 |
| 5,877,489 | 3/1999 | Ortyn et al. | 348/79 |

FOREIGN PATENT DOCUMENTS 0512290  11/1992  European Pat. Off. ........ H04L 29/06

OTHER PUBLICATIONS

"PCT International Search Report", 4 pages, (Jul. 15, 1996).

Daniel Bottin, et al., "The Use of the Reverse Channels on France—Telecom's OG Type Cable Networks", *Symposium Record Cable Sessions*, pp. 658–672, (Jun. 11, 1993).

N. Thouvenot, "Urban Video Surveillance System", *Electrical Communication*, 2nd Quarter, Paris FR, pp. 143–147, (1994).

"High Performance Serial Bus: P1394/Draft 6.8v1", *IEEE Computer Society*, 340, (Mar. 21, 1994).

Automated Imaging Association, "American National Standard for Automated Vision Components—Cameras—AIA Serial Communication Protocol Specification", pp. 1–22, Feb. 7, 1995.

Cypress, "Parallel Cyclic Redundancy Check (CRC) for HOTLink™", pp. 5–105–5–110, (fax dated Feb. 1, 1995).

Cypress, "HOTLink™ User's Guide", pp. 1–212, May 1994.

Digital Video Link, "Specification on the Standardization of Applied Machine Vision", cover page and pp. 1–24.

"FPGA's Tri–State Buffers Build 32×32 Crossbar", *EDN*, p. 116, Dec. 8, 1994.

Fiber Optic Technical Report, "Non–Return to Zero Clock Recovery and Data Retiming", 1, No. 1, pp. 1–6.

*Primary Examiner*—Tuan Ho
*Assistant Examiner*—Aung S. Moe
*Attorney, Agent, or Firm*—Schwegman, Lundberg, Woessner & Kluth P.A.

[57] ABSTRACT

A system for bidirectional digital serial communication and control of remote units including video cameras and input/output devices in machine vision systems. The communication system includes a main processor, communication hubs and remote units. The system is capable of monitoring and controlling the remote units in real-time while receiving video data images from the remote video cameras. Digital signals are transmitted in two different protocols; one for data communications, and one for control communications.

35 Claims, 15 Drawing Sheets

HIGH-SPEED DIGITAL VIDEO SERIAL LINK

This application is a continuation of U.S. patent application Ser. No. 08/410,119, filed on Mar. 24, 1995, now abandoned.

TECHNICAL FIELD OF THE INVENTION

The present invention relates generally to high speed digital serial communication and in particular to high speed digital communication for video data signals and control.

BACKGROUND OF THE INVENTION

In conventional machine vision communication and control systems, a processor is connected to remote devices such as video cameras using a cable having numerous conductors. The cable includes multiple control lines for controlling operations of the camera. These operations can include focusing the camera, positioning the camera, and capturing a picture. The cable also includes data, synchronization and timing lines for transmitting video signals from the camera to the processor and additional lines for supplying power to the camera.

Different control systems have been used to control a plurality of cameras. One system uses a plurality of cameras, each requiring a separate controller and a separate communication cable. This system becomes cost prohibitive to implement as the number of remote cameras increase. In another system, one controller can communicate with more than one camera. This system, however, requires that all cameras be the same type and that only one camera acquire an image at a time. Both of these systems have difficulty achieving the speed and flexibility required to control a plurality of cameras simultaneously and are limited in the number of cameras which can be controlled. In a manufacturing setting where real-time control of a number of different devices is needed, such conventional systems are impractical and often undesirably expensive.

The distance which a controller and camera can be separated is limited by the cost and operating characteristics of the cable. A cable having numerous conductors is expensive to purchase, install and maintain. Further, most video cameras' output signals are in an analog format which is susceptible to noise and attenuation losses, distortion, cross talk and ringing over long transmission cable distances. The cameras, therefore, must be located in proximity to the controller, further reducing the flexibility of such systems. A typical maximum distance between a controller and a camera is approximately 100 feet.

A further disadvantage of conventional systems is poor interchangeability of different types of cameras. That is, because a camera is connected to the controller with a specific cable, changing a camera may require a cable of a different configuration. If the new camera uses a different communication format, further modifications to the controller are required. Finally, operating characteristics which vary among cameras such as horizontal and vertical timing cannot be easily adjusted remotely.

For the reasons stated above, and for other reasons stated below which will become apparent to those skilled in the art upon reading and understanding the present specification, there is a need in the art for a fast, flexible and inexpensive communication and control system for video cameras and other remote devices.

SUMMARY OF THE INVENTION

The above mentioned problems with communication and control systems and other problems are addressed by the present invention and which will be understood by reading and studying the following specification. A communication and control system is described which provides real-time bi-directional communication and control of a plurality of remote devices, such as video cameras.

The present invention provides a high speed digital serial communication and control system, and corresponding methods of operation, for use in machine vision systems. The invention allows for real-time remote control of cameras and other input/output devices. The digital transmission of video data can include data error checking and has more noise immunity than conventional systems. The present invention uses simpler cheaper cables, increases the distance between the remote units and a main processor, allows for the easy mixing of camera types and provides the option of expanding the system by adding additional secondary hubs and cameras. The present invention simplifies the main processor and allows for the simultaneous acquisition of images from a plurality of remote video cameras. The invention allows a plurality of remote units to communicate with a main processor either with or without an intermediate communication hub. The remote units can be video cameras transmitting digital signals. Video cameras transmitting analog signals can be used, provided an intermediate communication hub is also used.

In particular, the present invention describes a vision control system using bidirectional high speed serial digital transmissions. The system comprises a main processor for receiving and transmitting packaged digital data or control signals, a primary communication hub having a first interface and a plurality of second interfaces, the first interface connected to the main processor through a serial communication bus, and a plurality of remote video cameras having a third interface connected to one of the second interfaces. The third interface comprises a transmitter for transmitting packaged digital data or control signals and a receiver for receiving packaged digital signals. The primary communication hub manages communications between the remote video cameras and the main processor and responds to high priority communications. In an alternate embodiment, at least one remote input/output unit is connected to one of the second interfaces allowing the main processor to communicate with any variety of remote devices.

In another embodiment, at least one secondary communication hub is connected to the primary communication hub for managing communications between the primary communication hub and additional remote video cameras.

The packaged digital video data signals comprise a source address code for identifying an address origin of the digital video data signal, a destination address code identifying a final address destination of the digital video data signal, a priority code identifying a priority of the transmission, and digital video data. The digital video data signals can further include a data error detection code for detecting errors in the digital video data, and a device identification code to identify a type of video camera originating the transmission.

The packaged digital control signals comprise a source address code for identifying an address origin of the digital control signal, a destination address code identifying a final address destination of the digital control signal, a priority code identifying a priority of the transmission, and digital control commands.

In still another embodiment, a vision control system using bi-directional high speed serial digital transmissions comprises a main processor, communication hub and a plurality of remote units. The main processor comprises a receiver for receiving packaged digital signals including a header and either digital data or control signals, a memory for storing the received digital signals, and a transmitter for transmitting packaged serial digital signals. The communication hub at least distributes transmissions between the main processor and a plurality of remote video cameras. The hub comprises a main processor interface connected to the main processor for communicating with the main processor and a plurality of remote video camera interfaces connected to the plurality of remote video cameras for communication with the plurality of remote video cameras. A communication hub interface is located at each of the remote video cameras for communication with the communication hub. Another embodiment describes a digital communication system comprising at least one camera and a processor.

Another embodiment describes a method of bidirectional communication in a vision control system between a plurality of remote video cameras and a main processor. The method comprising the steps of serially transmitting digital signal packets comprising digital data or control signals and a first header from the remote video cameras to a communication hub, using the communication hub, multiplexing the digital signal packets from the remote video cameras, evaluating a destination address identifier included in the first header and transmitting at least some of the digital signal packets to the main processor, serially transmitting digital signal packets including a second header from the main processor to the communication hub, and using the communication hub, evaluating a destination address identifier included in the second header and transmitting at least some of the packets to at least one the remote video cameras.

Still another embodiment includes the steps of transmitting a high priority digital signal packet comprising a header having a high priority identifier from a camera to the communication hub, interrupting a digital signal packet being transmitted by the communication hub to the main processor in response to the high priority digital signal packet and transmitting the high priority digital signal packet from the communication hub to the main processor, and completing the transmission of the interrupted digital signal packet.

Another embodiment includes a communication protocol for transmissions between a plurality of remote video cameras and a main processor. The protocol comprises a beginning code indicating a beginning of a transmission, a source address indicating an address of the transmission origin, a destination address indicating a destination of the transmission, a priority code indicating a priority of the transmission, data or control codes, and an ending code indicating the end of the transmission.

DETAILED DESCRIPTION OF THE INVENTION

In the following detailed description of the preferred embodiment, reference is made to the accompanying drawings which form a part hereof, and in which is shown by way of illustration specific preferred embodiments in which the inventions may be practiced. These embodiments are described in sufficient detail to enable those skilled in the art to practice the invention, and it is to be understood that other embodiments may be utilized and that logical, mechanical and electrical changes may be made without departing from the spirit and scope of the present inventions. The following detailed description is, therefore, not to be taken in a limiting sense, and the scope of the present inventions is defined only by the appended claims.

The digital serial link (DSL) of the present invention is a vision control system having bidirectional serial communications bus for transmitting digital data and control signals between remote video cameras and a main processor. The digital video data can be used by the main processor to generate a response based on the content of the video data. That is, the main processor can include a means for analyzing the video data so that the DSL can operate in a machine vision or image processing system.

Figure 1:
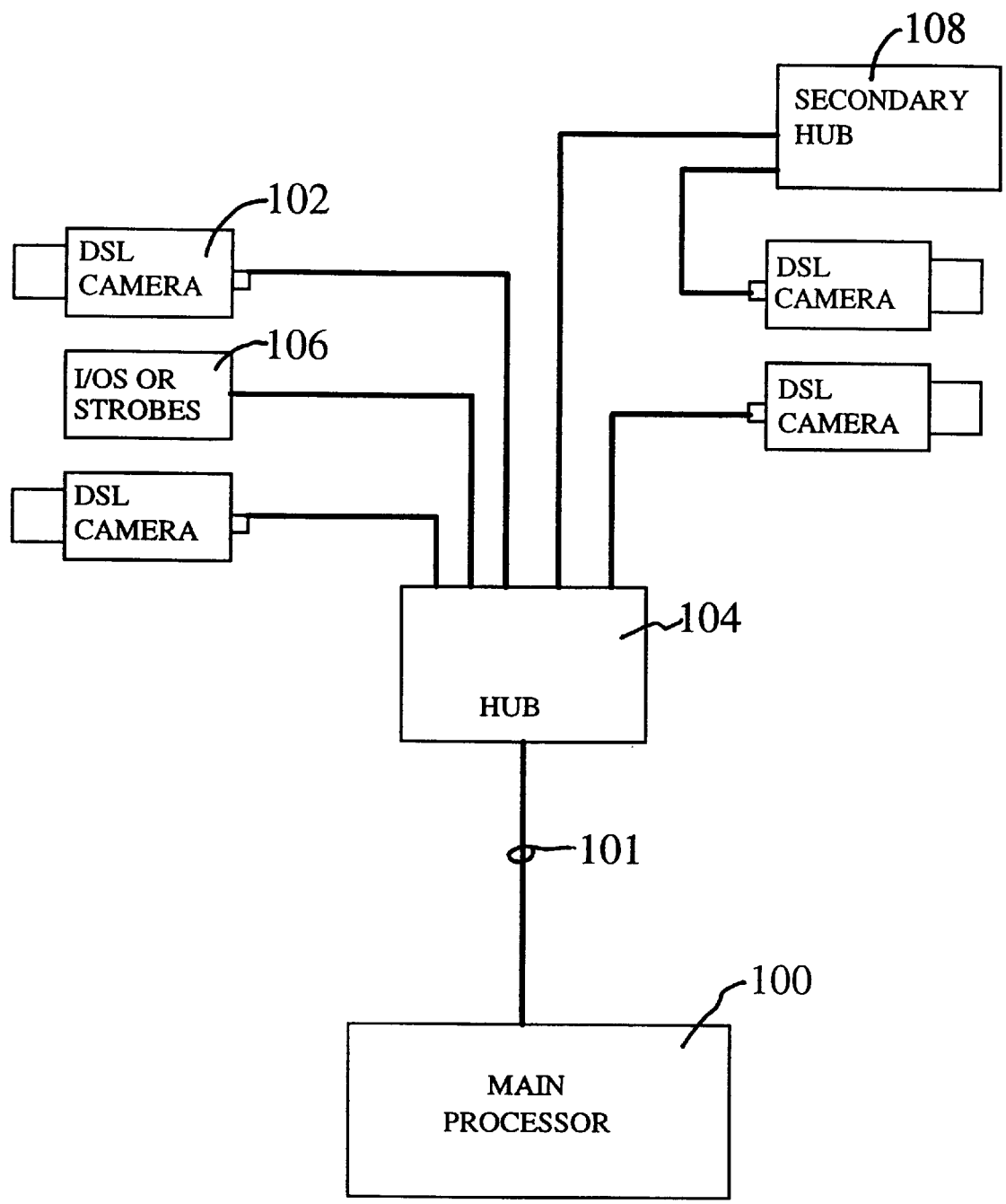
FIG. 1 is a block diagram of the digital serial link system of the present invention including a main processor, communication hub and remote units.

In the preferred embodiment, shown in FIG. 1, the DSL system has a main processor 100 and remote units 102, 106 which are connected to the main processor through a primary communication hub 104. The remote units can be video cameras 102, or input/output devices such as sensors, controls or strobe lights, generally referred to as remote units 106. Other remote units are contemplated including, but not limited to, personal computers, devices connected with RS232, programmable logic controllers and industrial control networks. It will be understood that any remote unit capable of receiving signals and generating output signals can be used in the present system. The primary hub 104 can also communicate with one or more secondary hubs 108. The secondary hubs function in a similar manner as the primary hub and are connected to additional remote units to thereby increase both the system's total capacity of remote units and the distance between remote units and the main processor. Distances of up to 250 feet can be achieved using low cost twisted pairs of wires between a primary hub and either a secondary hub or a remote unit. This distance can be greatly increased using higher cost links such as fiber optic lines. The primary hub multiplexes data from the remote units and secondary hubs into a serial data stream connected to the main processor 100 over communication link 101. The primary hub also distributes and processes the data transmitted from the main processor to the appropriate remote unit.

The communication link 101 between the main processor 100 and the primary hub 104 is preferably two twisted pairs of wires, with one pair being used for transmissions from the main processor to the primary hub and the other pair used to transmit from the primary hub to the main processor. Alternatively, fiber optic, coax cables or other communication media such as radio transmissions can be used for the communication link. The use of two separate data paths allows for independent and simultaneous communication in either direction, thereby providing the option of controlling a camera while monitoring the video signal transmitted by that camera. Alternatively, such duplex communication can be achieved with frequency multiplexing or other such techniques.

Figure 2:
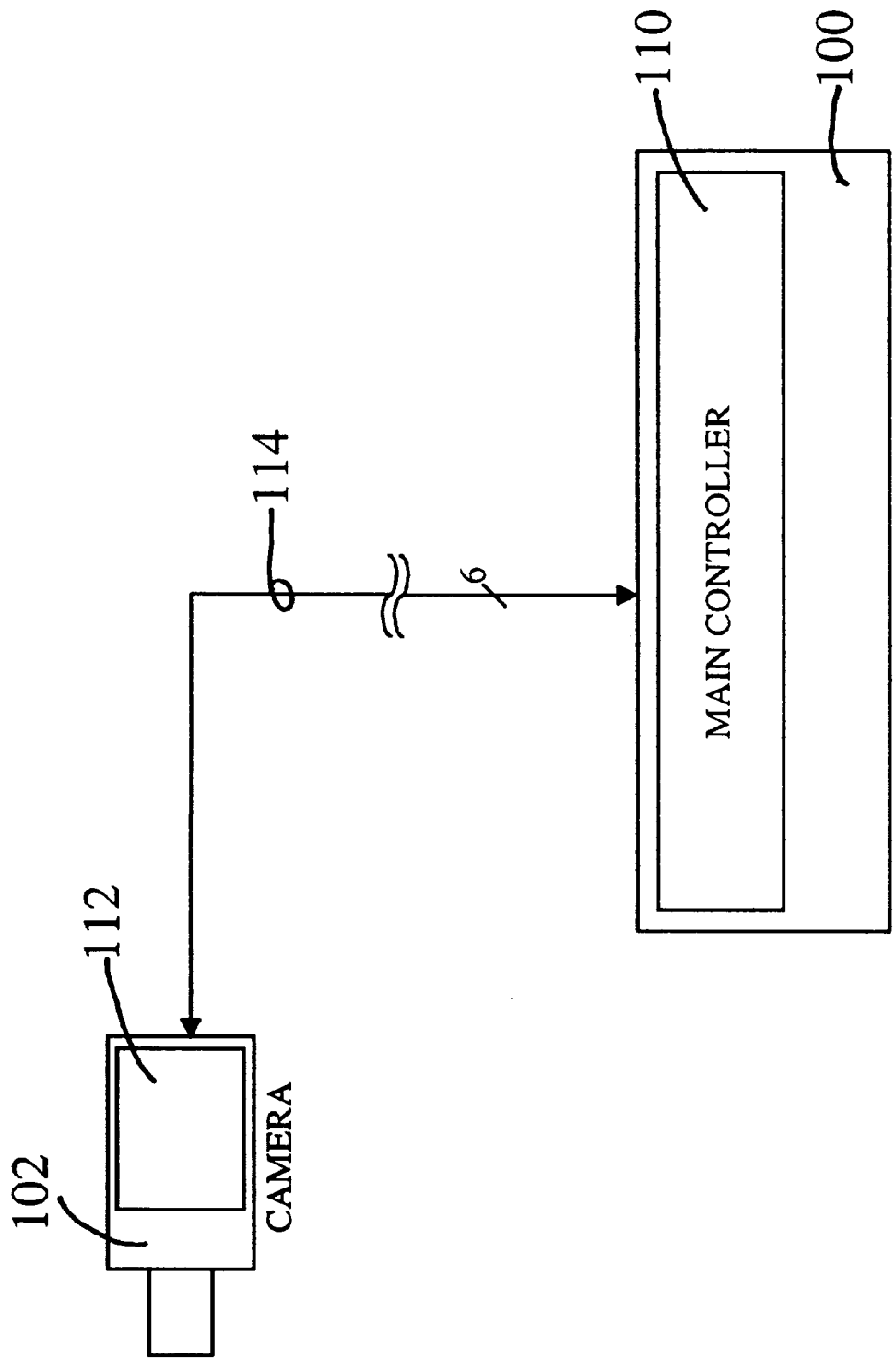
FIG. 2 is an alternate embodiment of the present invention including a main processor and a remote unit.

In an alternate embodiment where only one remote unit is used, as shown in FIG. 2, one remote unit, eg. a camera 102, can be connected directly with a main controller 110 of the main processor 100. The communication link 114 in this configuration comprises two twisted pairs, one pair for each communication direction and a pair of power supply lines (or similar communication connection for a different type of remote unit) to exchange digital video signals from the camera and control signals from the main processor.

Figure 3:
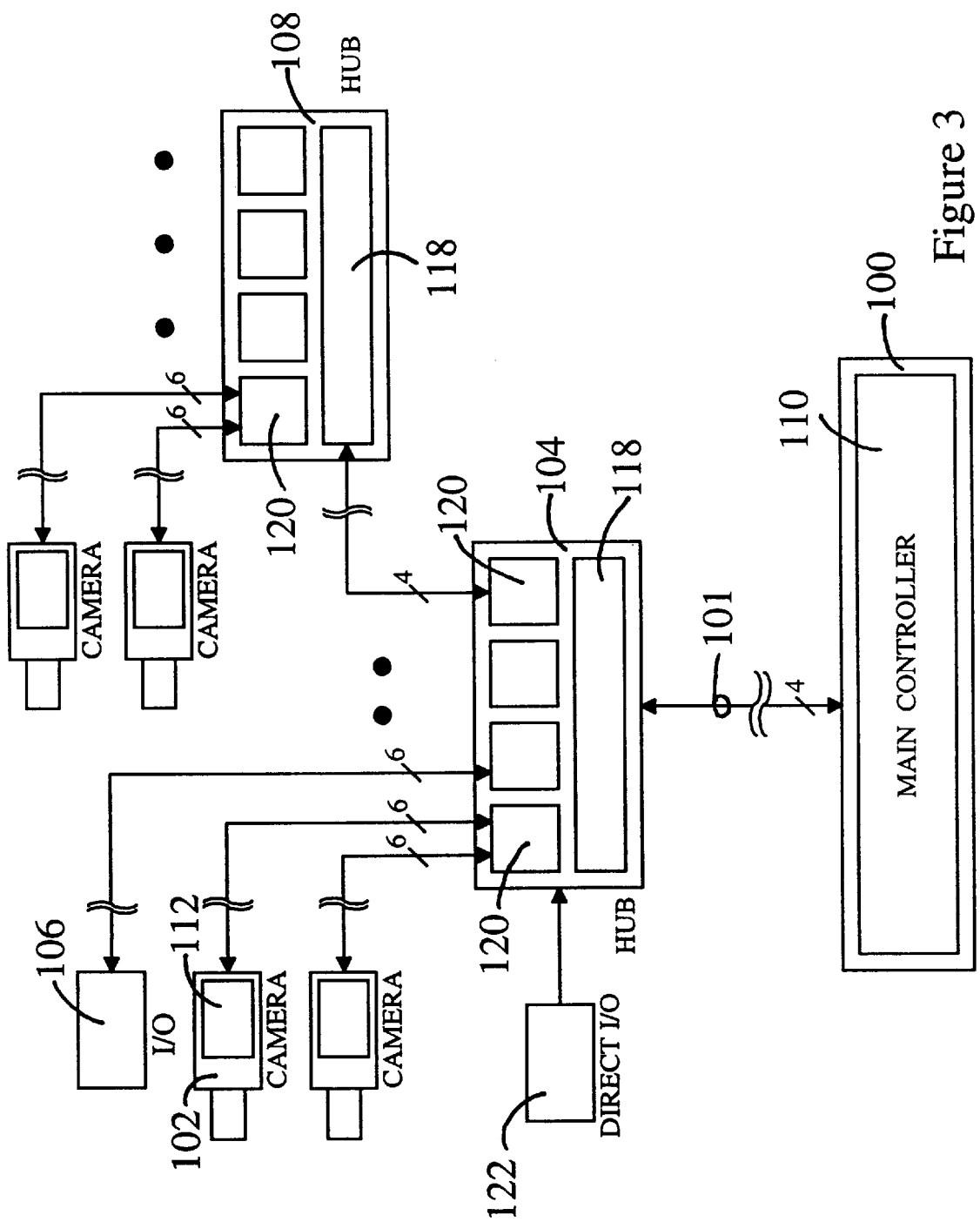
FIG. 3 is a more detailed diagram of FIG. 1.

Referring to FIG. 3, the preferred embodiment is shown in further detail. The main processor 100 has a main controller 110 for transmitting data to the primary hub and receiving data transmitted by the primary hub over link 101. The primary hub 104 has a main controller interface circuit 118 for transmitting data to the main processor and receiving data from the main processor. A plurality of remote unit interface circuits 120 connect the remote units 102, 106 and secondary hubs 108 to the primary hub 104. Each remote camera has an interface circuit 112 for processing data transmitted to and received from a hub. Direct input/output device 122 can communicate to the hub 104 directly without using a high speed serial link. These I/O devices can provide data directly to the hub which may then be used or further transmitted over the DSL.

The secondary hubs 108 are similar to the primary hub in that they have an interface circuit 118 for communication with the primary hub 104 and remote unit interface circuits 120 for communication with remote units. Before describing the interface circuits of the main processor 100, primary hub 104 and remote units, the protocol of digital serial transmissions in the system is described.

Communication Protocol

Figure 4:
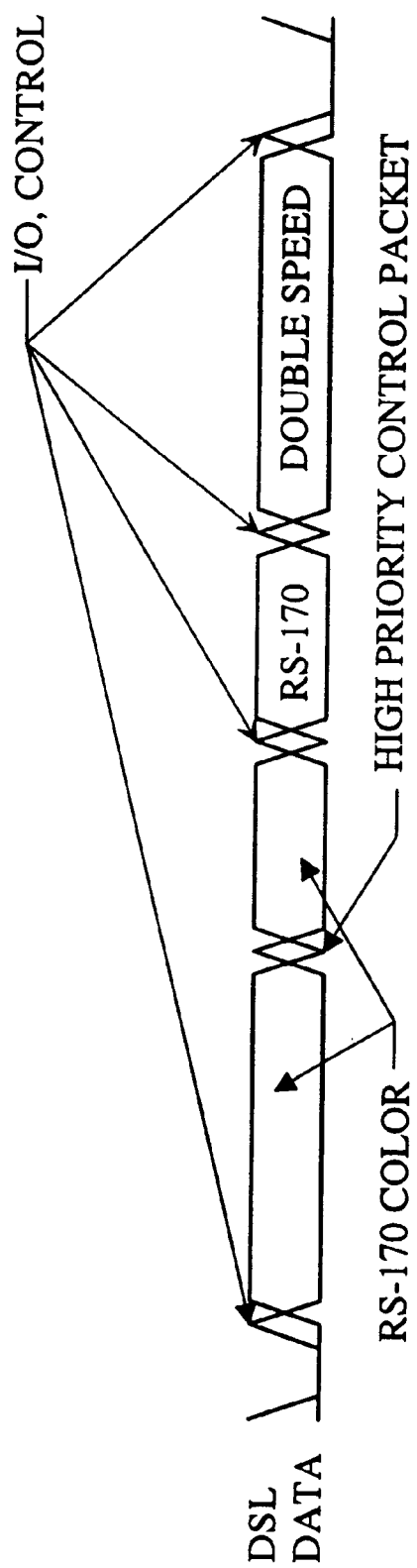
FIG. 4 illustrates a typical communication from the communication hub to the main processor of FIG. 1.

Referring to FIG. 4, data is communicated between the primary hub, the main processor and the remote devices using two distinct formats; a control packet, and a data packet. The control packet is a fixed length transmission used to provide control data. This control data can contain control information from the main processor which is directed to a remote unit to control, for example, a video camera. The control packet can be used to control operating features of the video camera such as gain, offset, shutter speed, zoom, focus, and iris aperture. The control packet can also contain requests from a remote unit for a particular service, for example, a camera may request that a strobe light be activated to assist in obtaining a video image. The control packet is preferably 81 bits long comprising nine bytes (bits 1–8) and an appended ninth bit as shown in Table 1.

TABLE 1

| Bit 9 | Bits 8–1 |
|---|---|
| 1 | Start of control packet |
| 0 | Source Address |
| 0 | Destination Address |
| 0 | (1 bit) priority code/(7 bit) device type |
| 0 | (3 bits) spare/(5 bit) data type |
| 0 | Data type index |
| 0 | Real Time Clock (lower byte) |
| 0 | Real Time Clock (upper byte) |
| 1 | End of control packet |

The ninth bit is used as a signaling bit to identify the transmission of control codes. A logical 1 indicates that a control code is included in the accompanying byte. The start of control packet is indicated by a unique identifier control code used to notify the receiver that a control packet is being transmitted. A different unique identifier can be used to indicate a high priority transmission, as described in greater detail below. That is, a high priority transmission and a standard priority transmission would have different "start of control packet" indicators. The second byte of the control packet contains the address of the original transmitting source of the control packet and the third byte contains the address of the final destination of the packet. A one bit priority code is included in the fourth byte of the control packet to indicate the priority of the communication. If the priority bit is a logical 1 the communication is high priority and a logical 0 indicates low priority. The remaining seven bits of the fourth byte are used to identify the type of device transmitting data, for example, a digital camera, line scanner or I/O device. The next byte contains five bits identifying the type of control being transmitted, for example, camera control. Three spare bits are also included in this byte. The data type index byte provides a detailed description of the control process desired. If the data type indicates a camera control, the data type index can be used to reset the camera, trigger the camera, or start and stop the transmission of video data. The data type and data type index can be considered a category and subcategory, respectively, thereby providing a means to communicate a multitude of control commands and requests. The real time clock is a 16 bit word contained in two bytes and used to identify the time in which the transmission was initiated. The real time clock can be used to monitor the efficiency of the DSL system by tracking the elapsed time between transmission and receipt. The last byte is a unique control code to identify the end of the control packet transmission.

The second communication format, a data packet, is used to provide variable length data from the transmitting device. In a transmission originating in a remote unit, such as a video camera, the data is preferably a video image. Alternatively, in a transmission originated at the main processor, the data is preferably information needed by a remote unit. The data packet can contain up to 2048 bytes of data in addition to 12 bytes of control information. The data packet format is illustrated in Table 2.

TABLE 2

| Bit 9 | Bits 8–1 |
| --- | --- |
| 1 | Start of data packet |
| 0 | Source address |
| 0 | Destination address |
| 0 | Priority (1 bit)/device type (7 bits) |
| 0 | Data type (5 bits)/data length (3 bits) |
| 0 | Lower 8 bits of data length |
| 0 | Real time clock (lower byte) |
| 0 | Real time clock (upper byte) |
| 1 | Start of data |
| 0 | Data |
|  | 1 . . . 2,048 bytes |
| 1 | End of data |
| 0 | Cyclic redundancy check (lower byte) |
| 0 | Cyclic redundancy check (upper byte) |
| 1 | End of data packet. |

The first four bytes of the data packet are similar to the first four bytes of the control packet. As with the data transmissions, a separate unique identifier can be used to indicate a high priority transmission. Therefore, a high priority transmission and a standard priority transmission would have different "start of data packet" indicators. The three spare bits of the fourth byte in the control packet are used in the data packet as the upper three bits of an 11 bit word used to indicate the length of the data being transmitted. The ninth bit of the data packet marks the transmission of a control code with a logic 1. The ninth bit and a unique control code are used to indicate the beginning of the data transmission. The data transmission can vary from one byte to 2048 bytes. The length of the transmission is primarily dependent upon the type of device transmitting. That is, as seen in FIG. 4, standard RS-170 video and double speed video transmit different length data packages as a result of the resolution of the video image captured by each type of video camera. Following the data transmission the ninth bit and a unique control code are used to indicate the end of the data transmission. Two bytes are used for a cyclic redundancy check (CRC). The last byte contains unique control code to signal the end of the data packet transmission.

To avoid erroneously processing transmissions from a remote unit, the ninth bit and a unique 'no-operate' code can be transmitted from the remote unit which indicates that the unit is not transmitting valid signals. This code, therefore, allows a remote unit to stop transmitting valid signals without confusing the receiver. When a receiver receives the no-operate code it remains in a hold state waiting for the no-operate code to end and valid signals to continue.

CRC is a standard data communication error detection technique incorporating the generation of a code at the transmission and the second generation of the code at the receiver using the transmitted data. The receiver compares the transmitted CRC and the second generated CRC to determine if errors occurred. A further description of CRC can be found in Cypress Semiconductor Applications Hand Book (April 1994) at 5–105. It will be understood by one skilled in the art that alternate error detection and correction techniques can be used.

The priority bit of both packets can be used to send urgent transmissions over the DSL. The primary hub typically multiplexes transmissions on a first-in first-out basis. If a high priority packet is transmitted to the hub, however, the hub will insert the packet into a currently transmitted packet. The receiving circuitry will trigger on the ninth bit signal and the unique identifier codes to retrieve the high priority packet without missing any data from the currently transmitted packet. As illustrated in FIG. 4, during the transmission of an RS-170 color video data packet, transmission is interrupted and a high priority control packet is inserted in the data stream, after which the remaining data packet is transmitted. Real-time control of remote devices can, therefore, be achieved. To assist the receiving circuitry in detecting the presence of a high priority packet, the start control packet byte and start of data packet can be used to indicate the transmission of a priority packet, as described above.

Main Controller Interface Circuitry

Figure 5:
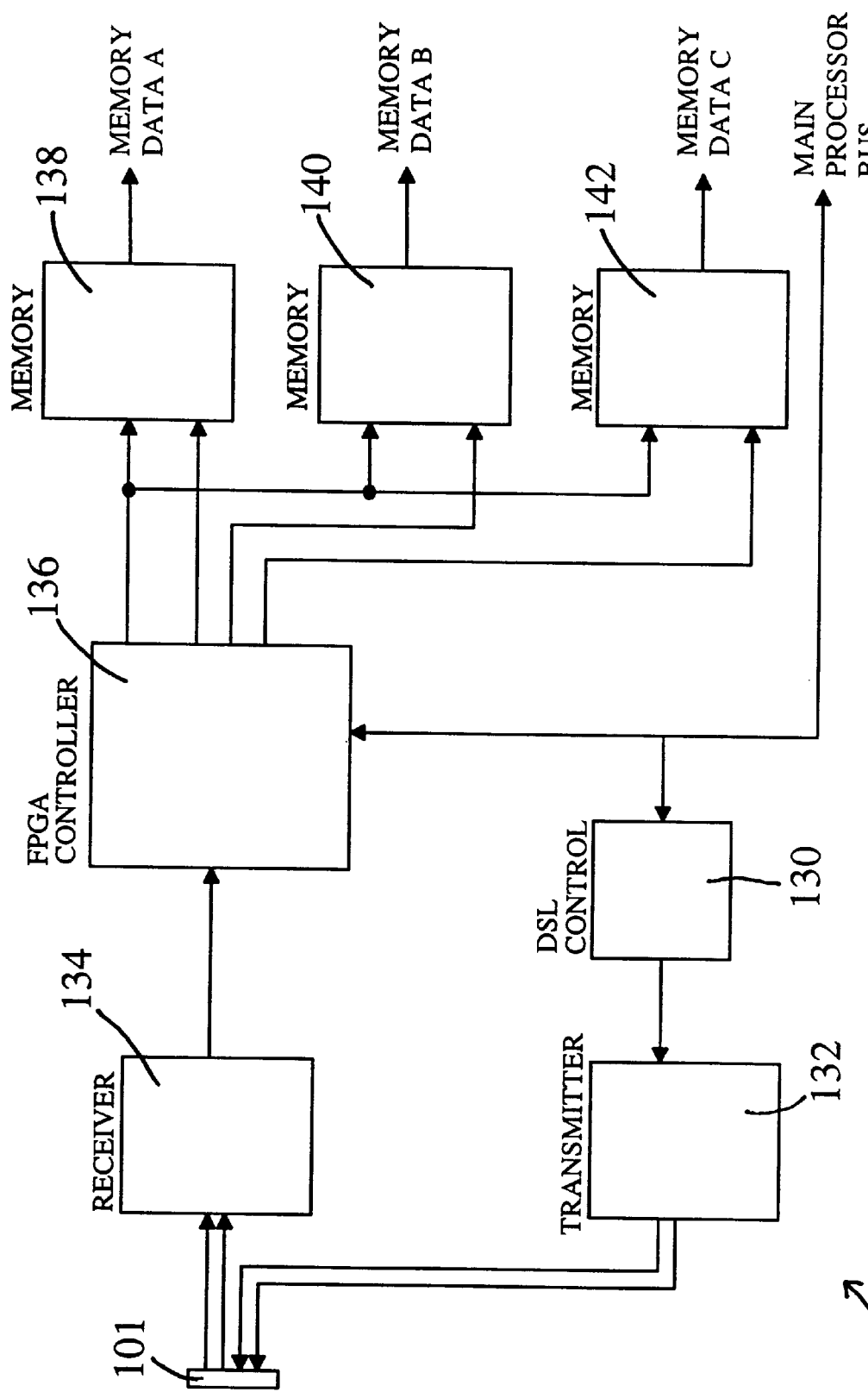
FIG. 5 is a block diagram of a main controller of the main processor of FIG. 1.
Figure 6:
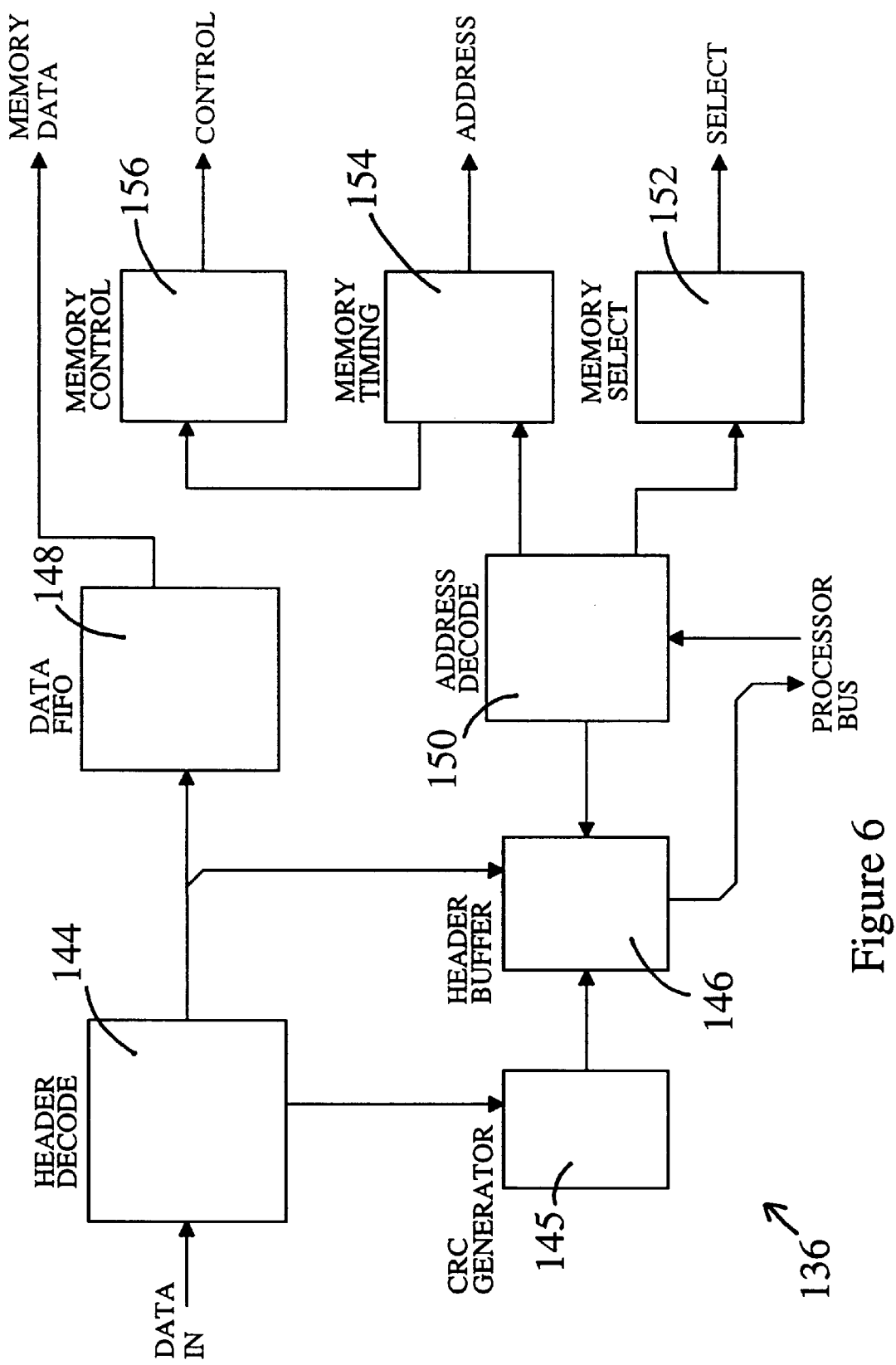
FIG. 6 is a detailed block diagram of a field programmable gate array (FPGA) controller of the main controller in FIG. 5.

Referring to FIGS. 5–6, the main controller 110 of the main processor 100 is described in detail. As described above, the main controller 110 connects the primary communication hub 104 to the main processor. That is, the main controller is an interface between the main processor and the rest of the DSL system. The controller 110 transmits control and data packets to the DSL and receives and stores packets for retrieval by the main processor. The control packets transmitted to the DSL could, for example, be used to enable different remote cameras, trigger cameras, request digital video outputs, or run built-in-self-tests (BIST) on the remote units. The control commands available are limited only by the type of remote units implemented and the above examples are not intended to limit the commands available for transmission from the main controller.

In the up-stream (toward the remote unit) direction, the main processor is connected to a DSL control circuit 130 to process upstream packets. The control 130 regulates upstream transmissions and provides the packets to transmitter 132 which transmits to a primary hub 104 over link 101. The preferred transmitters of the present system are HOTLink™ CY7B923 transmitters manufactured by CYPRESS Semiconductor Inc., San Jose, Calif. For detailed information and operation see HOTLink™ User's Guide (May 1994). In the down-stream direction transmissions are received from a primary hub by receiver 134 and processed by a field programmable gate array (FPGA) 136. It will be understood that a gate array or similar circuitry could be used in place of an FPGA. The preferred receivers of the present system are HOTLink™ CY7B933 receivers manufactured by CYPRESS Semiconductor Inc., San Jose, Calif. For detailed information and operation see HOTLINK User's Guide (May 1994). The transmissions received will typically be data packets including digital camera video and digital inputs, but other data transmissions are contemplated. The FPGA strips the header and CRC information from the received control and data packets. The video or input data is stored in memories 138, 140, 142 for access by the main processor either directly or through the FPGA. The memories are preferably synchronous dynamic random access memories (SDRAM), but can be any type of memory including video random access memories (VRAM).

The FPGA 136, as seen in FIG. 6, comprises a header decoder 144 for stripping the header and CRC generator 145 for generating the CRC code from received transmissions. The header preferably comprises the source address, destination address and the priority code of either the control or data packets. The CRC from the received transmission is accessible by the main processor through buffer 146 to check for errors in the received transmission. A copy of the header information is also stored in a buffer 146 for access by the main processor 100. Address decoder 150 is used to identify the address of the buffer which the main processor is accessing. First-in first-out (FIFO) buffer 148 provides an overflow protection for transferring the digital data to memories 138, 140, 142. The address decoder 150, memory select 152, memory address/timing 154, and refresh/memory control 156 circuits provide management control capabilities for the memories. The main processor, therefore, can select which memory is to be used for storing the received data.

Primary Hub Interface Circuitry

Figure 7:
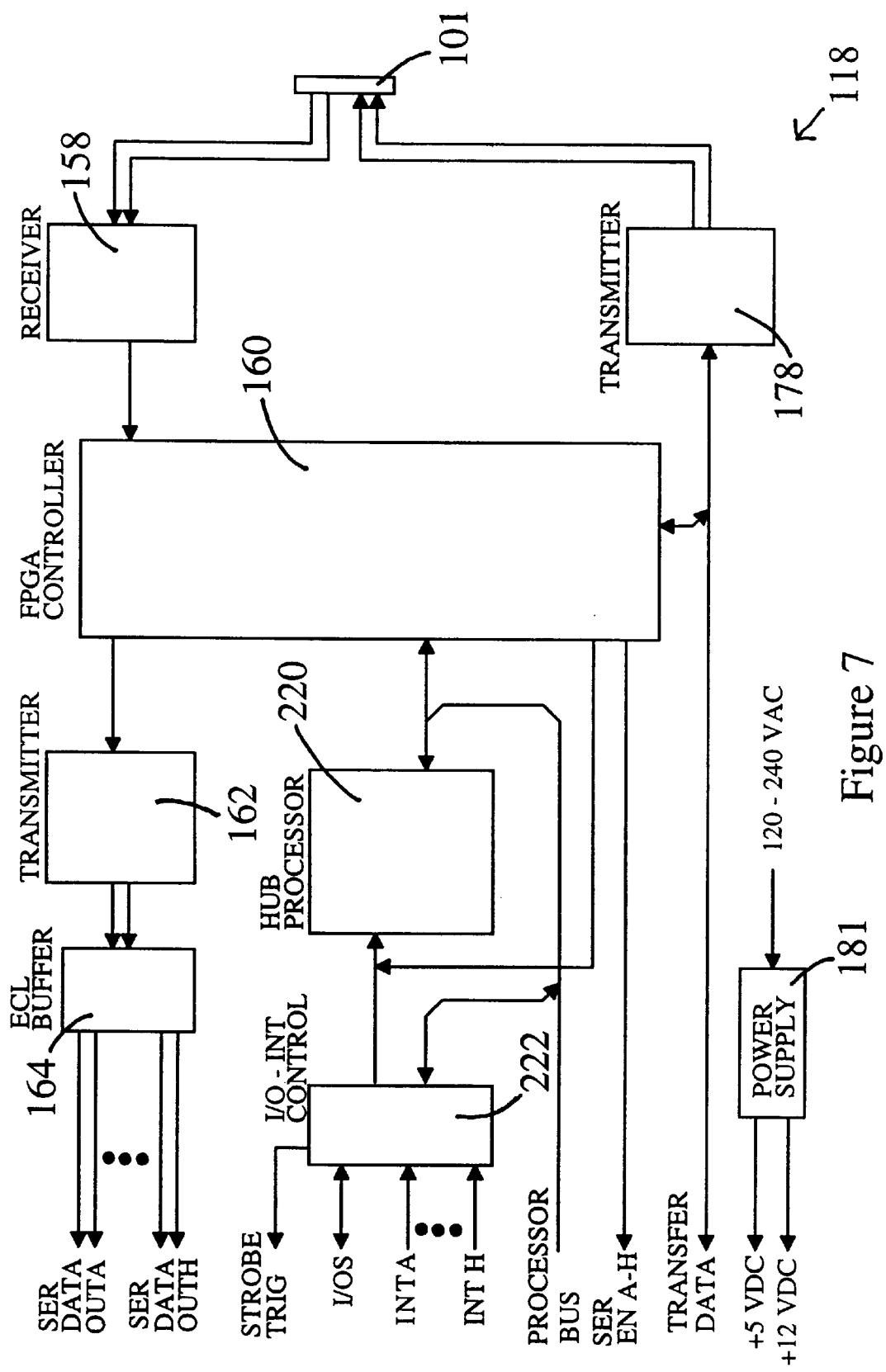
FIG. 7 is a block diagram of the main processor interface of the communication hub of FIG. 1.
Figure 8:
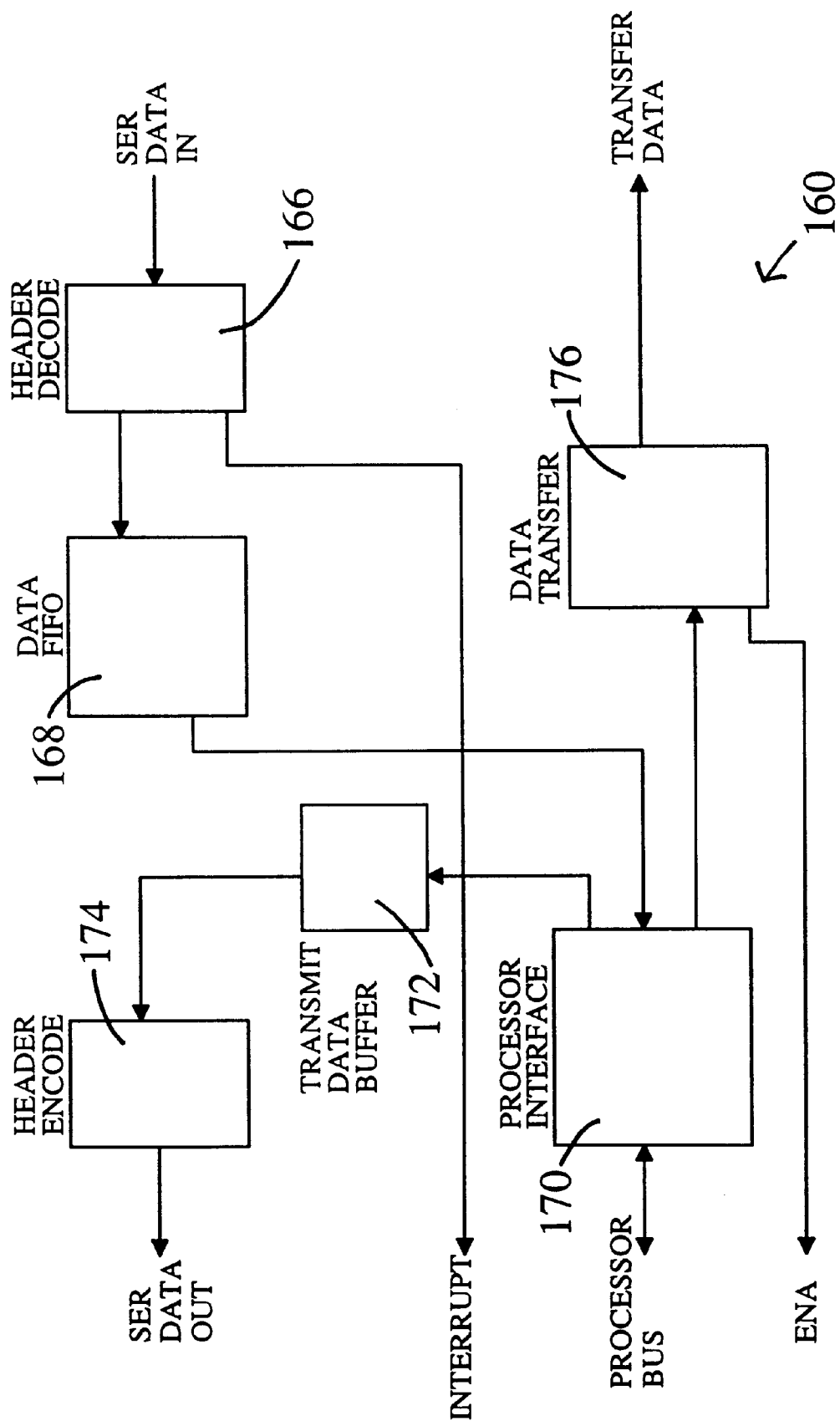
FIG. 8 is a detailed block diagram of a FPGA controller of the interface in FIG. 7.

The primary hub 104 comprises a main processor interface 118 and a plurality of remote unit interfaces 120. FIGS. 7 and 8 illustrate block diagrams of the main processor interface 118. In the up-stream direction, transmissions from the main processor 100 are received by receiver 158 and processed at FPGA 160. An up-stream transmission intended for remote units is further transmitted by transmitter 162 through buffer 164 to all the remote units connected to the primary hub.

The FPGA controller 160, of FIG. 7, of the main processor interface has an input header decoder 166 to strip the header from the transmission and store the transmission in FIFO buffer 168. Processor interface 170 determines if the primary hub is the destination address of the transmission. If the hub is the destination address, the transmitted data and header are processed and the desired operation indicated in the packet is conducted by the hub. If the hub is not the final destination, the received transmission is queued in buffer 172 and re-encoded in encoder 174. Down-stream transmissions are processed at processor interface 170 in substantially the same manner as up-stream transmissions. If the main processor is the intended destination, data transfer unit 176 transmits the signal to the main processor 100 through transmitter 178. I/O interrupt circuit 222 monitors direct I/O devices 122 and couples their outputs to the DSL. A power supply 181 is included in the primary hub to provide power to the remote units.

Figure 9:
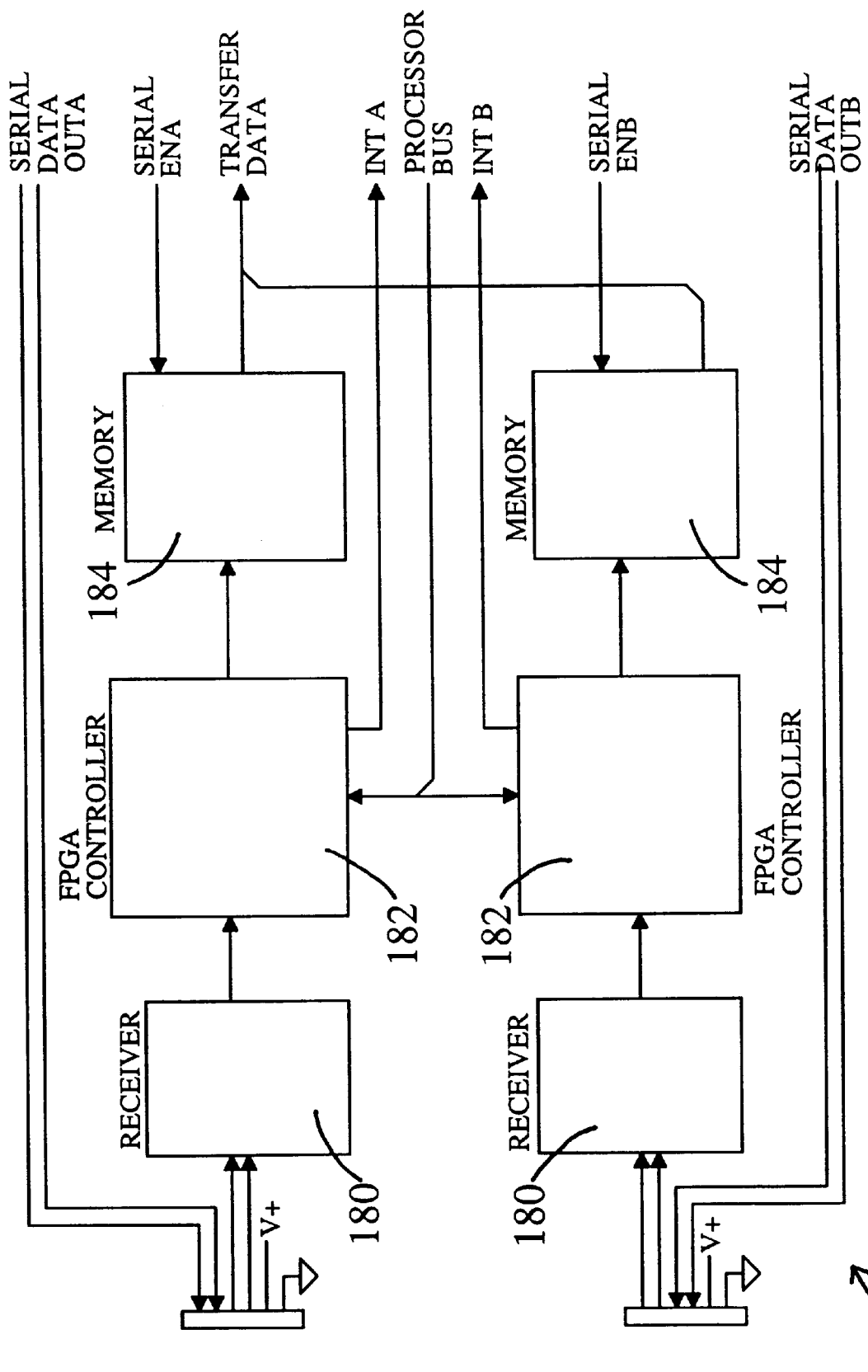
FIG. 9 is a block diagram of the remote unit interface of the communication hub of FIG. 1.
Figure 10:
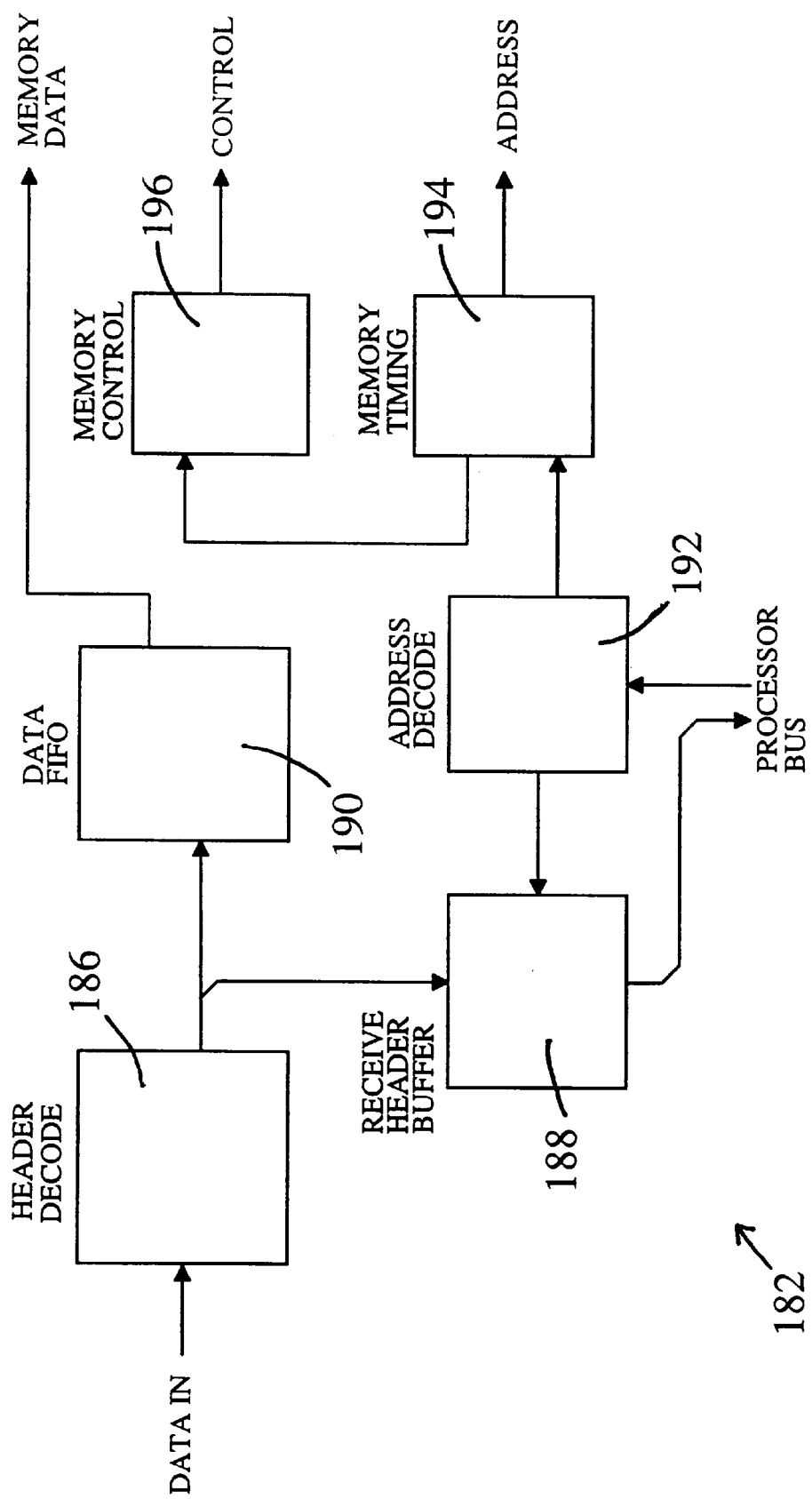
FIG. 10 is a detailed block diagram of a FPGA controller of the interface in FIG. 9.

Each remote unit interface 120 preferably interfaces with two remote units, as shown in FIG. 9. The remote unit interfaces are modular such that additional remote unit interfaces can be added to a hub to increase the number of remote units connected to the hub, see FIG. 3. The modular nature of the interfaces allows for easy expansion as a system increases in size. Up-stream transmissions merely pass through the interface and are not further processed. In the down-stream direction, however, the remote unit interface 120 has a receiver 180, FPGA controller 182 and a memory 184 associated with each remote unit interfaced. The FPGA 182 and memory 184 operate substantially the same as FPGA 136 and memories 138, 140, 142 of the main controller 110. The memories allow for the acquisition of multiple images at one time. In addition, the memories buffer data rate differences between input and output. Prior art systems can only acquire images from a limited number of cameras at one time and therefore inhibit image acquisition from other cameras connected to the system. This is a problem where the image may change during the time the camera is inhibited. Memory 184 allows the cameras to acquire an image without delaying the acquisition. The FPGA 182, as seen in FIG. 10, has a decoder 186 which strips the header from the received transmission and stores a copy of the header in buffer 188. The received transmission is placed in FIFO buffer 190 for storage in memory 184. The hub processor 220, FIG. 7, can address buffer 188 using address decoder 192. The hub processor can also control memory 184 through memory control circuit 196 and memory address/timing circuit 194.

Camera Interface

Figure 11:
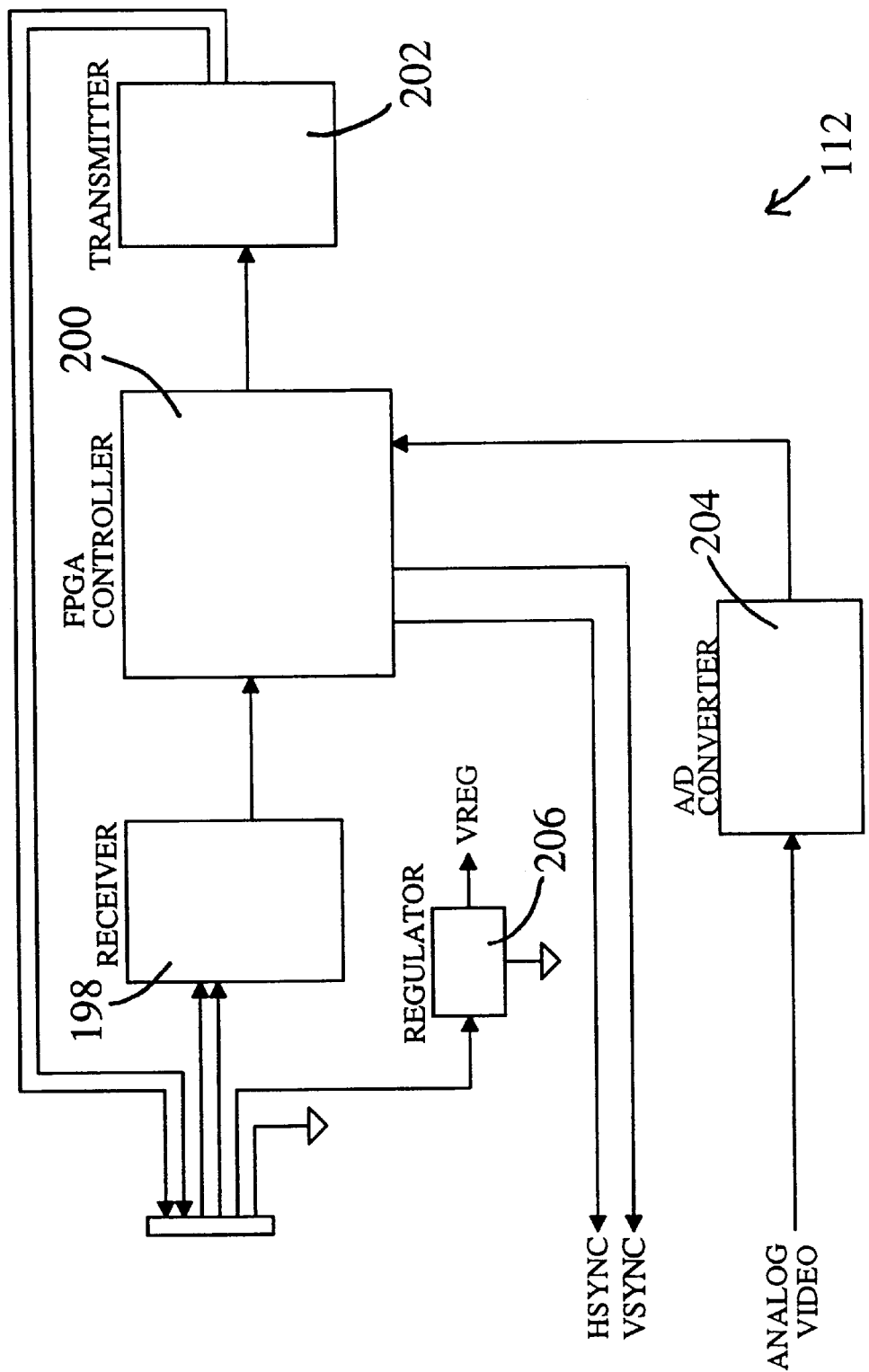
FIG. 11 is a block diagram of the interface of a remote camera of FIG. 1.
Figure 12:
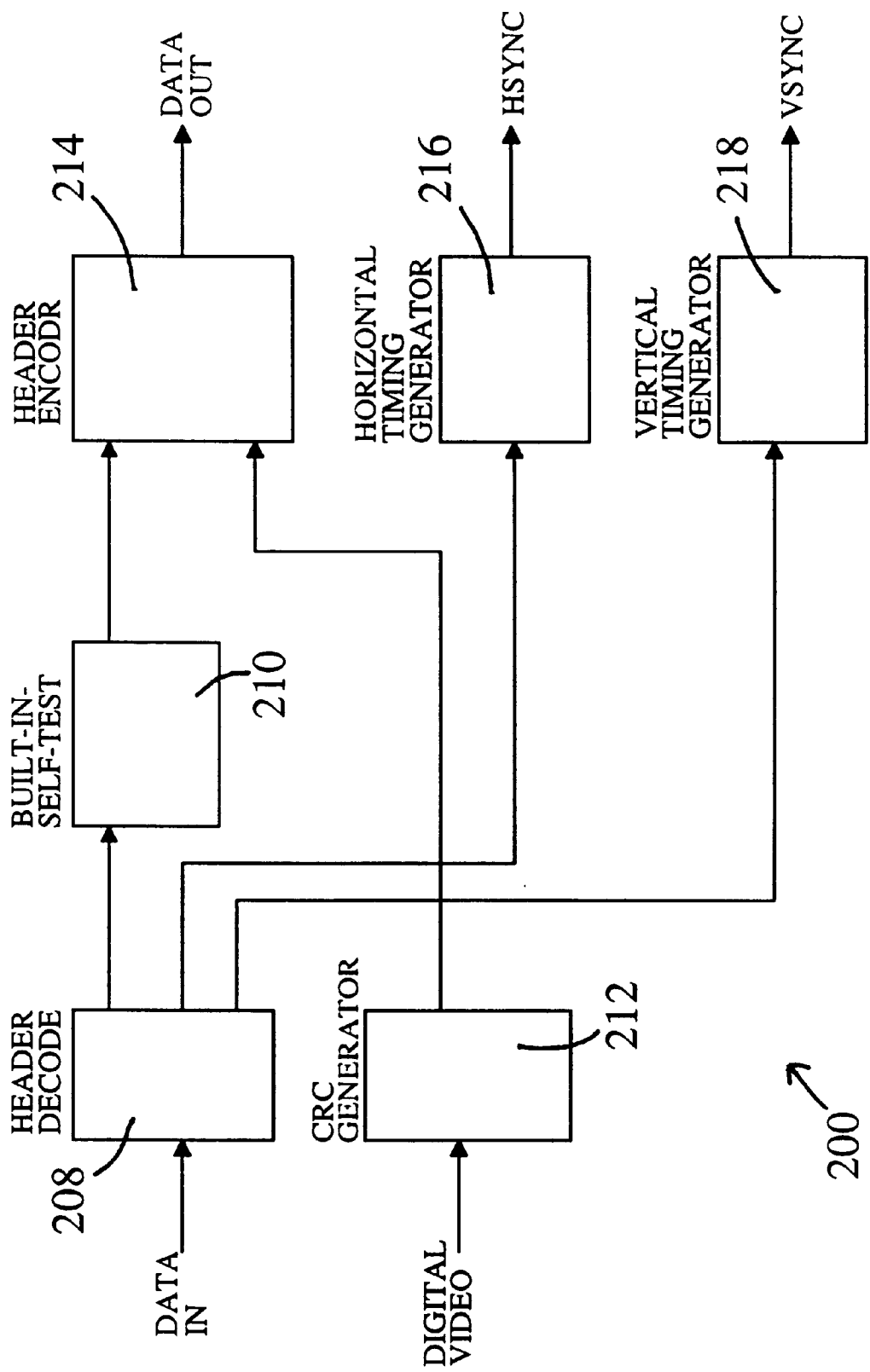
FIG. 12 is a detailed block diagram of a FPGA controller of the interface in FIG. 11.

The following is the preferred embodiment for a remote unit comprising a video camera 102. Referring to FIGS. 11 and 12, the camera has an interface 112 which contains a receiver 198 for receiving transmissions from the primary hub 104 and a transmitter 202 for transmitting to the primary hub. The interface is preferably a separate circuit which can be used with a plurality of different cameras. An alternative embodiment provides cameras containing the interface circuitry. The FPGA controller 200 controls both reception and transmission for the camera. Regulator 206 regulates power supplied by the power supply 181 of the primary hub. Analog to digital converter 204 converts an analog video signal generated by the camera into a digital video signal for transmission to the primary hub.

Figure 13:
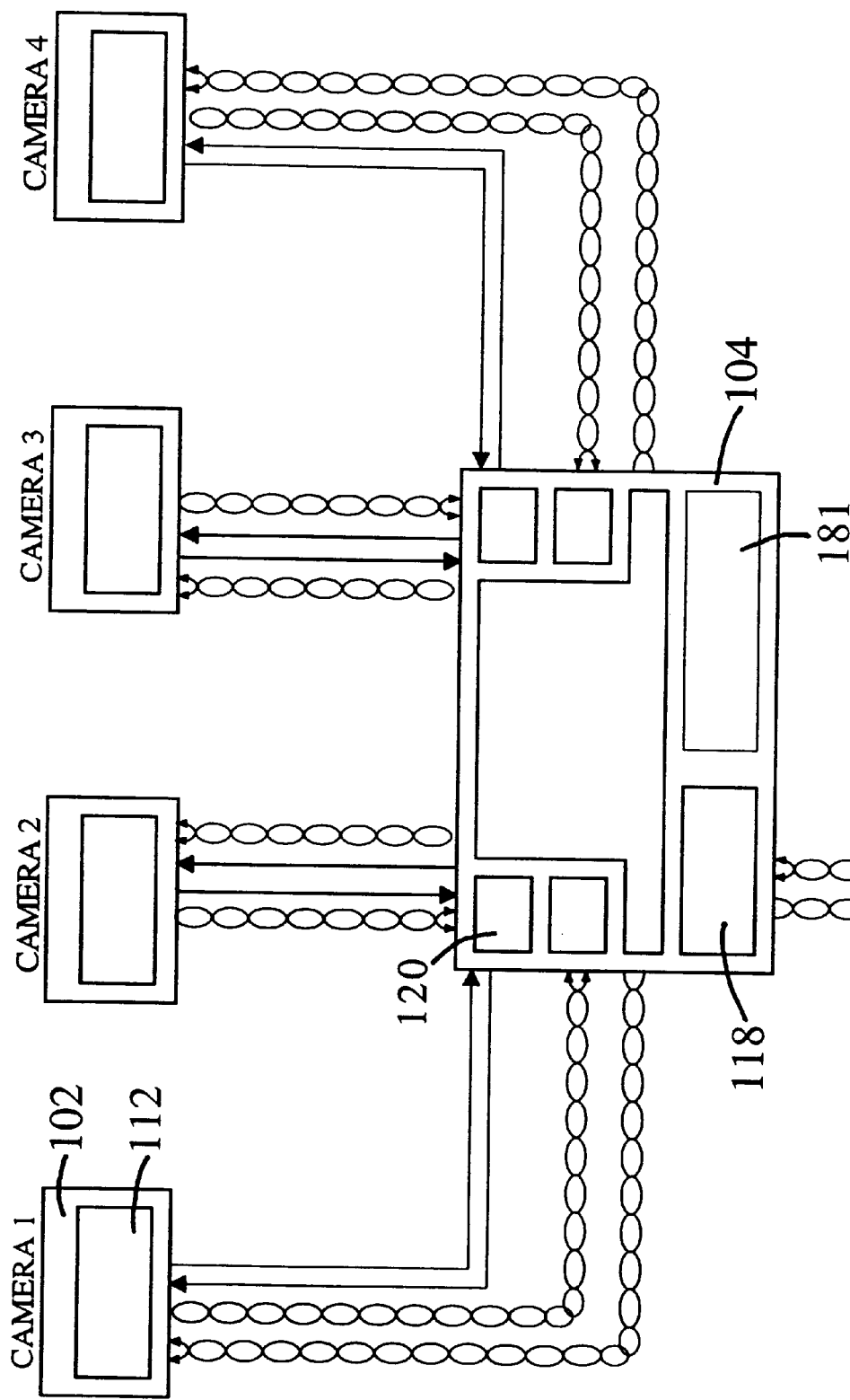
FIG. 13 is a star configuration of a number of remote cameras and a communication hub of the present invention.
Figure 14:
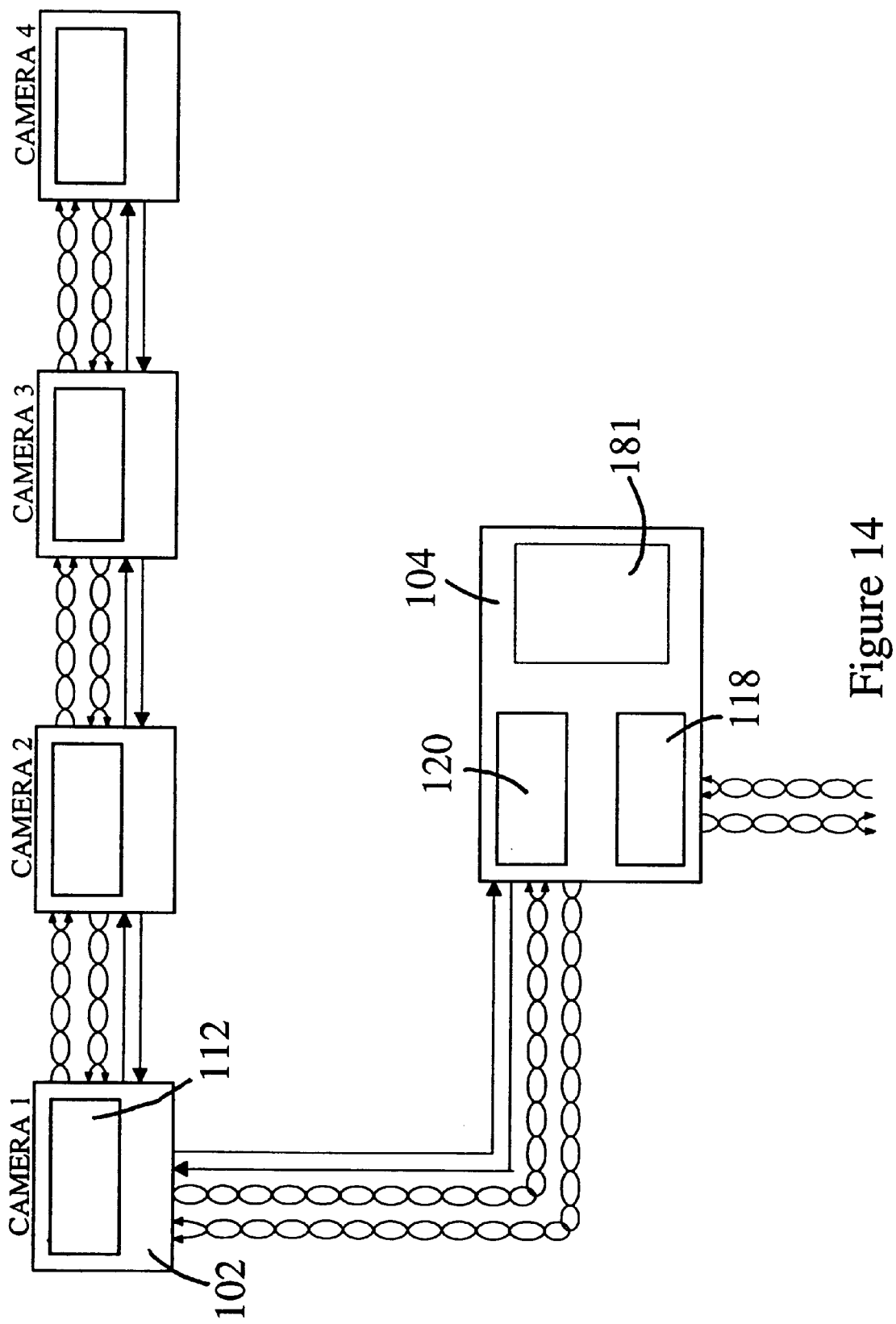
FIG. 14 is a bidirectional daisy chain configuration of a number of remote cameras and a communication hub of the present invention.
Figure 15:
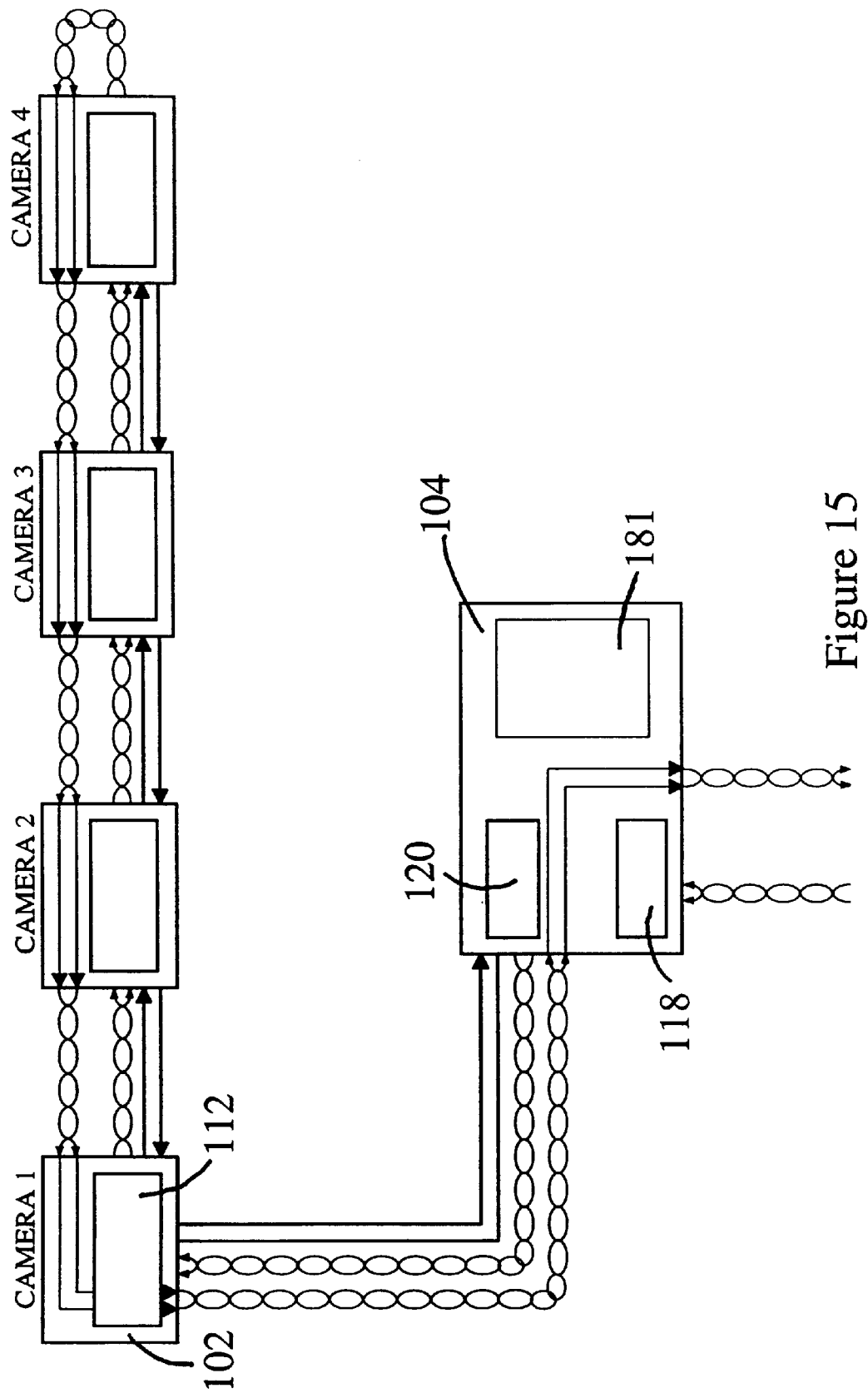
FIG. 15 is a single direction daisy chain configuration of a number of remote cameras and a communication hub of the present invention.

The FPGA 200 comprises a header decoder 208 for decoding the header and determining if the camera is the intended destination of the received signal. Preferably each remote unit has both a unique address and a global address for receiving transmissions. The unique address is used for a particular unit, while the global address is used for all of the remote units. If either address is detected, the FPGA processes the signal. A built in self test circuit 210 provides the ability to test the camera and transmit the results to the primary hub. To transmit digital video data from analog to digital converter 204, CRC generator 212 produces the CRC code bytes used in the transmitted data packet, as explained above, and encoder 214 encoded the header for the transmission. Horizontal timing generator 216 and vertical timing generator 218 are used to remotely adjust the timing of the camera depending on the type of camera used. It will be recognized that additional operating characteristics of the camera can be remotely controlled by the DSL system. FIG. 13 illustrates one preferred configuration of remote cameras. A plurality of cameras, cameras 1–4, are arranged in a star configuration. That is, each camera has a separate communication link to the primary hub 104 and is independent of the other cameras. FIG. 14 illustrates an alternative configuration of remote cameras. A plurality of cameras, cameras 1–4, are arranged in a bi-directional daisy chain configuration. That is, the communication hub communicates with the cameras over a common link. FIG. 15 illustrates another alternate configuration of remote cameras. A plurality of cameras, cameras 1–4, are arranged in a single direction daisy chain configuration. That is, the communication hub transits to one camera and receives from a different camera, with each camera connected in series.

Alternately, one skilled in the art will recognize that analog video cameras can be used to transmit to a primary or secondary hub using analog signals. Because the signals are analog, no analog-to-digital circuitry is needed at the camera. The analog signal is transformed into the digital signal as described above at the remote unit interface 120. In this embodiment, the remote unit interface 120 comprises components comparable to the converter 204, CRC generator 212 and the encoder 214 as described above. This embodiment allows for the economical use of analog cameras by not requiring a user to purchase digital camera interfaces. Further, both analog and digital cameras can be used in combination in a DSL.

Operation of the DSL System Remote Camera communication

The DSL communication and control system as described above and shown in FIG. 1 provides communication between remote units 102, 106, at least one communication hub 104 and a main processor 100. The operation of the communication system is best understood by first examining the down stream communication from a remote video camera 102.

The camera interface 112 of FIGS. 11 and 12 receives analog video signals from the remote video camera 102 and converts the analog signal to digital using converter 204. Converting the analog signal to digital allows flexibility in camera selection. Different cameras can be used or exchanged without requiring extensive changes in cable connections as with a conventional system. Further, the horizontal and vertical timing generators 216, 218, as described in further detail below, allow for the use of different cameras without changing the camera interface 112. The digital video signal is received at FPGA controller 200 where the CRC generator 212 generates the CRC bytes of the data packet as shown above in Table 2. The digital video data and CRC are combined at the header encoder 214 to generate data packets as shown in Table 2 above. Alternatively, the FPGA controller 200 can generate control packets as previously shown in Table 1. These control packets preferably request that either the primary hub 104 or the main processor 100 perform some function, such as trigger a strobe light 106. The communications from the controller 200 are transmitted to the primary hub 104 via transmitter 202. The conductor cable between the remote video camera 102 and the primary hub 104 is shielded and preferably comprises six conductors; two for serial communication to the hub, two for serial communication from the hub and two power supply lines.

Referring to FIGS. 7 through 10, the transmitted packets from each camera are received at the primary hub by receiver 180 and processed by FPGA controller 182. The header of the packet is decoded at header decoder 186 and a copy of the header is stored in buffer 188. The received packet is stored in the FIFO buffer 190 prior to being stored in the memory 184. Address decode 192 allows the hub processor 220 to read and control buffer 188, and control the storage of the packet to the memory 184. I/O interrupt control circuit 222 monitors interrupt requests from a plurality of interrupt lines INT A through INT H associated with the plurality of remote units. As stated above, I/O interrupt control circuit 222 monitors direct I/O devices 122. If an I/O device sends a signal to the hub, a specific response or operation may be started. For example, a direct sensor may send a signal indicating that a camera acquire a picture. In response the hub will send command to the camera to take a picture. The camera will then respond back to the hub and request that a strobe be triggered.

If a transmission from a remote unit is received by the primary hub a signal is provided on the corresponding interrupt line and the control circuit 222 determines if the transmission is a high priority. A high priority signal is processed as described above such that a standard transmission is interrupted temporarily. If a high priority control packet is received from a video camera requesting that a strobe light be triggered, the primary hub immediately transmits a strobe trigger signal to the strobe 106 associated with the requesting camera.

The hub processor 220 controls the multiplexing of the data stored in the memories 184 of the remote unit interfaces 120 to the FPGA controller 160. As seen in FIG. 8, the processor interface 170 takes the output from the hub processor 220 and relays the data to the high speed data transfer circuit 176. The digital serial packet is then transmitted to the main processor by transmitter 178 via cable link 101 at 330 Mbps (mega bits per second), however, speeds of 660 Mbps can be used. It will be understood that in speeds in excess of one giga bits per second are contemplated.

The transmission is received by the main controller 110 of the main processor 100 at receiver 134. The header of the received transmission is decoded at decoder 144 and a copy of the header is stored in the buffer 146. The CRC code for received data packets is decoded at decoder 145 and a copy is also stored in buffer 146. The received packet is stored in FIFO buffer 148 prior to storage in one of the memory 138, 140, 142. Address decoder 150 allows the main processor 100 access to the header and CRC stored in the buffer 146. The main processor also controls the storage of the packets to the memory using circuits 152, 154, and 156. The main processor evaluates the received CRC code to determine if an error occurred in the transmission.

As seen in FIG. 1, secondary hubs 108 can be used to increase the number of remote units serviced by one main processor and increase the distance between a remote unit and the main processor. This hierarchical structure is implemented using the same principles as the primary hub, except the secondary hub will multiplex the remote units serviced thereby to the primary hub.

As can be seen, the present invention provides a communication and control system for receiving data and control requests from a plurality of remote units. Remote units which require immediate attention can be controlled without substantially interrupting communication with other remote units, thereby allowing image acquisition from an unlimited number of video cameras. Communication hubs can be used to respond to some of the control requests from the remote units to reduce the transmissions to the main processor and increase the speed of the system. Real-time control can, therefore, be obtained. As will be seen below, the main processor can receive data from a camera while simultaneously controlling that camera.

Main processor communication

The communication and control of upstream packets from the main processor is best understood starting with FIG. 3. A transmission originating at the main processor 100 is transmitted over the communication link 101 to the primary hub 104. If the intended receiving address is the primary hub, the transmission stops there. If, however, a remote unit 102 is the destination address, the transmission is broadcast to all remote units and the intended unit acts upon the received transmission.

Referring to FIGS. 5, 7–9, a communication packet originating at the main processor is transmitted over the communication link 101 to the primary hub 104 via the DSL control 130 and the transmitter 132. Receiver 158 of the main controller interface 118 receives the transmission packets and relays the packets to the FPGA controller 160. The headers of the packets are decoded by decoder 166 and the headers and data are stored in FIFO buffer 168. Each decoded header is evaluated at processor interface 170. If the hub is the destination address of the communication, the requested action is performed by the hub processor. If, however, the destination address is not the hub, the decoded header is transferred to the header encoder 174 through data buffer 172. The re-encoded header and data are transmitted using transmitter 162 and buffer 164 to all of the remote units over serial data lines OUT A through OUT H. Upstream transmissions effectively bypass the remote unit interfaces 120 to connect with the serial data conductor lines associated with each remote unit.

The receiver 198 of each remote camera 102 captures the up-stream transmissions and decoder 208 decodes the header. If the destination address matches an address of the remote unit the command code is followed. If the address does not match, the transmission is ignored. Each remote unit as described above preferably has a unique address and a global address such that remote units can be addressed individually or simultaneously. The command code can indicate a variety of desired operations, in particular a camera could run a self test using self test circuit 210 or the horizontal and vertical timing can be adjusted using generators 216 and 218. It will be understood that a variety of operations can be controlled remotely, and are not intended to be limited to those described.

As can be seen, the present invention provides a communication and control system for transmitting data and control commands to a plurality of remote units. The main processor can control either the remote units directly, or instruct the primary or secondary hubs to perform a specified operation. Control operations can be distributed to increase efficiency and communication speed. Real-time communication and control can, therefore, be obtained. The main processor can receive data from one camera while simultaneously controlling another camera.

Summary

The present invention provides a high speed digital serial communication and control system, and corresponding methods of operation, for use in machine vision systems. The invention allows for real-time remote control of cameras and other input/output devices. The digital transmission of video data can include data error checking and has more noise immunity than conventional systems. The present invention uses simpler cheaper cables, increases the distance between the remote units and a main processor, allows for the easy mixing of camera types and provides the option of expanding the system by adding additional secondary hubs and cameras. The present invention simplifies the main processor and allows for the simultaneous acquisition of images from a plurality of remote video cameras. The invention allows a plurality of remote units to communicate with a main processor either with or without an intermediate communication hub. The remote units can be video cameras transmitting digital signals. Video Cameras transmitting analog signals can be used, provided an intermediate communication hub is also used.

What is claimed is:

1. A machine vision control system for use in a manufacturing environment using two-directional high speed serial digital transmissions comprising:
   a main processor that receives packaged digital data and control signals and that transmits packaged digital data and control signals, the main processor including an analyzer circuit that analyzes received video image data and that generates and transmits a packaged digital first control signal that includes a content-analysis response based upon content of the video image data;
   a primary communication hub having a first interface and a plurality of second interfaces, the first interface connected to the main processor through a serial communication bus that transmits and receives the packaged digital data and control signals;
   a plurality of remote video cameras each having a third interface that is connected to one of the plurality of second interfaces for two-directional communication with the primary communication hub; and
   a first trigger source responsive to a manufacturing process or assembly step, that provides a signal commanding that one of the plurality of remote video cameras acquire an image; wherein
   the primary communication hub is adapted to generate a priority response to a high priority request signal, the priority response being inserted between the beginning and end of transmission of a digital data packet carrying video information from one of the remote video cameras to the main processor, and wherein real-time manufacturing operations are performed using the first control signal.

2. The machine vision control system of claim 1 further including at least one secondary communication hub connected to one of the plurality of second interfaces of the primary communication hub for managing communications between the primary communication hub and additional remote video cameras.

3. The machine vision control system of claim 1 wherein the packaged digital data signals comprise a source address code for identifying an address origin of the digital data signal, a destination address code identifying a final address destination of the digital data signal, a priority code identifying a priority of the transmission, and digital data.

4. The machine vision control system of claim 3 wherein the packaged digital data signals further include a data error detection code for detecting errors in the digital data, and a device identification code to identify a type of camera originating the transmission.

5. The machine vision control system of claim 1 wherein the packaged digital control signals comprise a source address code for identifying an address origin of the digital control signal, a destination address code identifying a final address destination of the digital control signal, a priority code identifying a priority of the transmission, and digital control commands.

6. The machine vision control system of claim 1 further including at least one remote input/output unit connected to the primary communication hub for at least receiving transmissions from the primary communication hub.

7. The machine vision control system of claim 6 where the remote input/output unit is an industrial control network.

8. The machine vision control system of claim 6 where the remote input/output unit is a strobe light.

9. A machine vision control system for use in a manufacturing environment using two-directional high speed serial digital transmissions comprising:
   a main processor that receives packaged digital video data signals and transmitting packaged digital video data signals at a data rate of up to at least about 330 mega bits per second, the main processor including an analyzer circuit that analyzes received video image data and that generates a content-analysis response based upon content of the video image data;
   at least one remote video camera connected to the main processor that provides two-directional communication of the serial digital video data and control signals with the main processor; and
   a trigger source that provides a signal commanding that a remote video camera acquire an image at a specific point in time, wherein real-time manufacturing operations are performed using the content-analysis response.

10. The machine vision control system of claim 9 wherein the digital video data signals comprise a source address code for identifying an address origin of the digital video data signal, a destination address code identifying a final address destination of the digital video data signal, a priority code identifying a priority of the transmission, and digital data.

11. The machine vision control system of claim 10 wherein the digital video data signals further include a data error detection code for detecting errors in the digital video data signal, and a device identification code to identify a type of video camera originating the transmission.

12. The machine vision control system of claim 9 wherein the digital control signals comprise a source address code for identifying an address origin of the digital control signal, a destination address code identifying a final address destination of the digital control signal, a priority code identifying a priority of the transmission, and digital control commands.

13. The machine vision control system of claim 9 further including at least one remote input/output unit connected to the main processor for at least receiving transmissions from the main processor.

14. A machine vision control system for use in a manufacturing environment using two-directional high speed serial digital transmissions between at least a main processor and a communication hub, the system comprising:

the main processor comprising a receiver for receiving packaged digital signals including a header and either digital data and control signals, a memory for storing the received digital signals, and a transmitter for transmitting packaged serial digital signals, the main processor including an analyzer circuit for analyzing received video image data and generating a content-analysis response based upon content of the video image data;

the communication hub for at least distributing transmissions between the main processor and a plurality of remote video cameras, the communication hub comprising a main processor interface connected to the main processor for communicating with the main processor and a plurality of remote video camera interfaces connected to the plurality of remote video cameras for communication with the plurality of remote video cameras, the main processor interface comprising a receiver for receiving digital transmissions from the main processor, a processor, a first transmitter for transmitting signals to at least one remote video camera, and a second transmitter for transmitting packaged signals to the main processor, each one of the plurality of remote video camera interfaces comprising a receiver associated with each of the plurality of remote video cameras, a controller associated with each receiver for controlling transmissions from one of the plurality of remote video cameras, and a memory for storing the transmissions;

a video camera having a communication hub interface for communication with the communication hub, the video camera comprising a transmitter, a receiver, and a controller for controlling communication with the communication hub; and a first trigger source for providing a signal commanding that one of the plurality of remote video cameras acquire an image at a specific point in time, the communication hub adapted to generate a priority response to a high priority request signal transmitted from the remote camera or from the first trigger source, and generate a signal to acquire an image in response to the first trigger source, and wherein real-time manufacturing operations are controlled based on the content-analysis response.

15. The machine vision control system of claim 14 further including at least one analog video camera connected to the communication hub.

16. A main processor for two-directional high speed digital serial communication in a machine vision control system for use in a high-speed manufacturing environment having a plurality of remote video cameras, the main processor comprising:

a receiver for receiving packaged digital video data or control signals including a header, the packaged digital video data or control signals;

a controller for separating the header from the digital video data or control signals;

a memory for storing the digital video data or control signals;

an analyzer circuit for analyzing received video image data and generating a content-analysis response based upon content of the video image data; and a transmitter for transmitting packaged digital signals, the transmitted packaged digital signals including a header in response to the received packaged digital video data or control signals, and wherein real-time manufacturing operations are controlled based on the content-analysis response.

17. A video camera interface for two-directional high speed digital serial communication in a machine vision control system between a plurality of remote video cameras and a processor, the video camera interface comprising:

a receiver for receiving packaged digital signals from the processor;

a transmitter for transmitting packaged digital transmissions comprising a header and either digital video data or digital control signals;

a controller for controlling communication with the processor; and wherein the video camera interface is adapted to send a signal requesting that an external input/output device coupled to a primary communication hub be activated to flash illumination for a camera at a specific point in time, and wherein real-time manufacturing operations are performed using resulting real-time high-speed digital transmissions for control signals, said control signals including the signal requesting that the external input/output device's flash illumination be activated.

18. The video camera interface according to claim 17, further comprising a trigger activation circuit that receives a trigger signal and activates acquisition of a particular image corresponding to the trigger signal by the video camera.

19. A communication hub for two-directional high speed digital serial communication in a machine vision control system between a plurality of remote video cameras and a processor, the hub comprising:

a processor interface connected to the processor; and a plurality of remote video camera interfaces connected to the plurality of remote video cameras, including a first remote video camera interface and a second remote video camera interface;

the processor interface comprising a receiver for receiving packaged digital transmissions from a main processor, a first transmitter for transmitting packaged serial digital signals to at least one of the plurality of remote video cameras on the first remote video camera interface, and a second transmitter for transmitting packaged serial digital signals to at least one of the plurality of remote video cameras over the second remote video camera interface, and a third transmitter for transmitting packaged signals to the main processor over the processor interface;

each one of the plurality of remote video camera interfaces comprising a receiver associated with each of the plurality of remote video cameras, a controller associated with each receiver for controlling transmissions from one of the plurality of remote video cameras, and a memory for storing the transmissions; and the communication hub adapted to activate, at a specific point in time, an external flash illumination input/output device in response to a request signal transmitted from one of the plurality of remote video cameras, and wherein real-time manufacturing operations are performed using resulting real-time high-speed digital transmissions for control signals, said control signals including the request signal.

20. The communication hub of claim 19 further including a control circuit for directly communicating with at least one input/output device.

21. The communication hub of claim 19 further including a control circuit for directly controlling at least one output device.

22. A method of operating a machine vision control system having a plurality of remote video cameras and a main processor, the method comprising the steps of:

receiving an input trigger signal from a trigger source;

generating a first digital packet based upon the input trigger signal;

capturing an image of an object with one of the plurality of remote video cameras at a specific point in time in response to the first digital packet;

converting the image to one or more digital video signal packets including an appended first header;

serially transmitting the one or more digital video signal packets from one of the plurality of remote video cameras to a communication hub;

multiplexing digital video signal packets from the remote video cameras, evaluating a destination address identifier included in the first header, and transmitting at least some of the digital signal packets to the main processor; and analyzing the digital video signal packets with the main processor to evaluate the captured image and generating a content-analysis response signal, and wherein real-time manufacturing operations are controlled based on the content-analysis response signal.

23. The method of claim 22 further including the steps of:

serially transmitting digital control signal packets including a second header from the main processor to the communication hub; and using the communication hub, evaluating a destination address identifier included in the second header, and transmitting at least some of the packets to at least one the remote video cameras.

24. The method of claim 22 further including the steps of:

transmitting a high priority digital signal comprising a header having a high priority identifier from a camera or other I/O device to the communication hub;

interrupting a digital signal being transmitted by the communication hub to the main processor in response to the high priority digital signal and transmitting the high priority digital signal from the communication hub to the main processor; and completing the transmission of the interrupted digital signal.

25. The method of claim 22 further including the steps of;

transmitting a digital signal request packet from one of the remote video cameras or other I/O device where the destination address is an address corresponding to the communication hub;

evaluating the destination address identifier at the communication hub; and responding to the digital signal request packet with the communication hub.

26. The method of claim 22 further comprising the steps of:

transmitting a control signal from the communication hub to a camera requesting that the camera capture an image of an object;

transmitting from the camera to the communication hub a high priority signal requesting that a strobe light be activated; and analyzing the high priority signal with the communication hub and transmitting a control signal to the strobe light from the communication hub commanding the activation of the strobe light.

27. The method of claim 22 further comprising the steps of:

generating a camera activation command and transmitting the command from the communication hub to the one of the plurality of remote video cameras in response to the received input trigger signal;

generating a strobe light activation request signal with the one of the plurality of remote video cameras; and activating a strobe light in response to the strobe light activation request signal.

28. A machine vision control system for use in a manufacturing environment using high speed serial digital communications comprising:

one or more remote video cameras, each camera having a digital serial camera interface that (a) transmits packaged serial digital data representing an image acquired by the camera, and that (b) receives a command to, at a specific point in time, acquire an image;

a main processor having a processor interface coupled to the camera interface, wherein the processor interface includes a receiver that receives packaged serial digital data and packaged serial digital control signals and a transmitter that transmits packaged serial digital data signals and packaged serial digital control signals, the main processor further having an analyzer circuit that analyzes received video image data and generates a content-analysis response signal based upon content of the video image data, and wherein high-speed manufacturing operations are controlled based on the content-analysis response signal, wherein a protocol used by the main processor receiver that receives packaged serial digital data or packaged serial digital control signals is also used by the main processor transmitter that transmits packaged serial digital data signals or packaged serial digital control signals.

29. The machine vision control system of claim 28, further comprising:

a primary communication hub having a first interface and one or more second interfaces, the first interface coupled to the main processor through a serial communication bus that transmits and receives the packaged digital data and control signals, and each one of the one or more second interfaces coupled to a respective one of the one or more remote video cameras to transmit and receive packaged digital data and control signals, wherein the primary communication hub is adapted to generate a priority response to a high priority request signal transmitted from the plurality of remote cameras or a trigger source, the priority response being inserted between the beginning and end of transmission of a digital data packet carrying video information from one of the remote video cameras to the main processor, and to generate a signal to acquire an image in response to the trigger source.

30. The machine vision control system of claim 29, wherein the primary communication hub further includes a memory, and wherein image data from a first one of the one or more video cameras is stored in the memory while image data from a second one of the one or more video cameras is communicated from the hub to the main processor.

31. The machine vision control system of claim 29, wherein the primary communication hub is adapted, based on the priority response, to insert a second serial digital data packet based on the high-priority request signal into a middle portion of a first serial digital data packet.

32. The machine vision control system of claim 31, wherein each byte transmitted on the processor interface includes a bit indicating whether the byte is a header byte or not in order to facilitate detection of inserted data packets.

33. The machine vision control system of claim 29, wherein the content-analysis response signal is used to control a manufacturing process input/output device.

34. The machine vision control system of claim 28 wherein the communication link used by the main processor includes a fiber optic link.

35. The machine vision control system of claim 28, wherein a communication link used by the main processor receiver that receives packaged serial digital data and packaged serial digital control signals and by the main processor transmitter that transmits packaged serial digital data signals and packaged serial digital control signals allows simultaneous transmission and reception of data.

* * * * *